(12) United States Patent
Huang et al.

(10) Patent No.: US 10,609,472 B2
(45) Date of Patent: Mar. 31, 2020

(54) SPEAKER MODULE AND PROJECTOR

(71) Applicant: QISDA CORPORATION, Taoyuan (TW)

(72) Inventors: Hung-Yen Huang, Taoyuan (TW); Huai-Wen Hsu, Taipei (TW); Chun-Ming Shen, Taipei (TW); Chin-Kuei Lee, Taoyuan (TW); Cheng-Chih Huang, New Taipei (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 16/215,499

(22) Filed: Dec. 10, 2018

(65) Prior Publication Data

US 2019/0182582 A1   Jun. 13, 2019

(30) Foreign Application Priority Data

Dec. 11, 2017   (CN) .......................... 2017 1 1309582

(51) Int. Cl.
*G03B 21/14*   (2006.01)
*H04R 1/28*   (2006.01)
*G03B 31/00*   (2006.01)
*H04R 1/02*   (2006.01)

(52) U.S. Cl.
CPC .......... *H04R 1/288* (2013.01); *G03B 21/145* (2013.01); *G03B 31/00* (2013.01); *H04R 1/025* (2013.01); *H04R 1/028* (2013.01); *H04R 2499/15* (2013.01)

(58) Field of Classification Search
CPC ...... G03B 21/22; G03B 21/58; G03B 21/145; H04R 1/025; H04R 1/028; H04R 1/288; H04R 1/345
See application file for complete search history.

(56) References Cited

U.S. PATENT DOCUMENTS

| | | | |
|---|---|---|---|
| 2005/0083486 A1* | 4/2005 | Johnson ................. | G03B 29/00 353/15 |
| 2007/0053531 A1* | 3/2007 | Ohta ...................... | H04R 17/00 381/152 |
| 2007/0180745 A1* | 8/2007 | Ofuji ..................... | G03B 21/58 40/601 |
| 2010/0059651 A1* | 3/2010 | Morrison .............. | F16F 1/3732 248/562 |
| 2013/0248281 A1* | 9/2013 | Liang ..................... | H04M 1/03 181/207 |
| 2016/0192075 A1* | 6/2016 | Shibata ................... | H04R 7/26 381/398 |
| 2017/0134848 A1* | 5/2017 | Shao .................... | H04R 1/2834 |
| 2017/0332175 A1* | 11/2017 | Fan ........................ | H04R 7/127 |

FOREIGN PATENT DOCUMENTS

| | | |
|---|---|---|
| CN | 201491209 U | 5/2010 |
| CN | 103686024 A | 3/2014 |

* cited by examiner

*Primary Examiner* — Sultan Chowdhury (57) ABSTRACT

A speaker module includes a bracket, a plurality of first cushion members, a speaker and a plurality of second cushion members. The bracket includes a plurality of first pillars. Each of the first cushion members is disposed on one of the first pillars. The speaker is connected to the first cushion members. The second cushion members are connected to a periphery of the bracket.

16 Claims, 9 Drawing Sheets

SPEAKER MODULE AND PROJECTOR

BACKGROUND OF THE INVENTION

1. Field of the Invention

The invention relates to a speaker module and a projector and, more particularly, to a speaker module capable of providing good vibration-proof effect and a projector equipped with the speaker module.

2. Description of the Prior Art

Recently, projectors are getting more and more popular. With the capacity of video playing, projectors are applied not only for common office meetings, but also for various seminars or academic courses. In general, in addition to a projection module for displaying images, the projector may also be equipped with a speaker for outputting sound. The speaker may generate vibration while outputting sound, such that the projection module and the speaker may resonate with each other. Therefore, a projection screen of the projector may vibrate due to the vibration of the speaker, such that the stability of projection screen will be influenced.

SUMMARY OF THE INVENTION

An objective of the invention is to provide a speaker module capable of providing good vibration-proof effect and a projector equipped with the speaker module, so as to solve the aforesaid problems.

According to an embodiment of the invention, a speaker module comprises a bracket, a plurality of first cushion members, a speaker and a plurality of second cushion members. The bracket comprises a plurality of first pillars. Each of the first cushion members is disposed on one of the first pillars. The speaker is connected to the first cushion members. The second cushion members are connected to a periphery of the bracket.

According to another embodiment of the invention, a projector comprises a casing, a projection module and a speaker module. The projection module is disposed in the casing. The speaker module is disposed in the casing. The speaker module comprises a bracket, a plurality of first cushion members, a speaker and a plurality of second cushion members. The bracket comprises a plurality of first pillars. Each of the first cushion members is disposed on one of the first pillars. The speaker is connected to the first cushion members. The second cushion members are connected to a periphery of the bracket.

As mentioned in the above, the invention disposes the first cushion members on the first pillars of the bracket and connects the second cushion members to the periphery of the bracket. By means of double vibration-proof structure consisting of the first cushion members and the second cushion members, the vibration generated by the speaker can be absorbed effectively, so as to prevent the projection module and the speaker from resonating with each other. Accordingly, the speaker module of the invention can provide good vibration-proof effect, so as to ensure the stability of projection screen.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
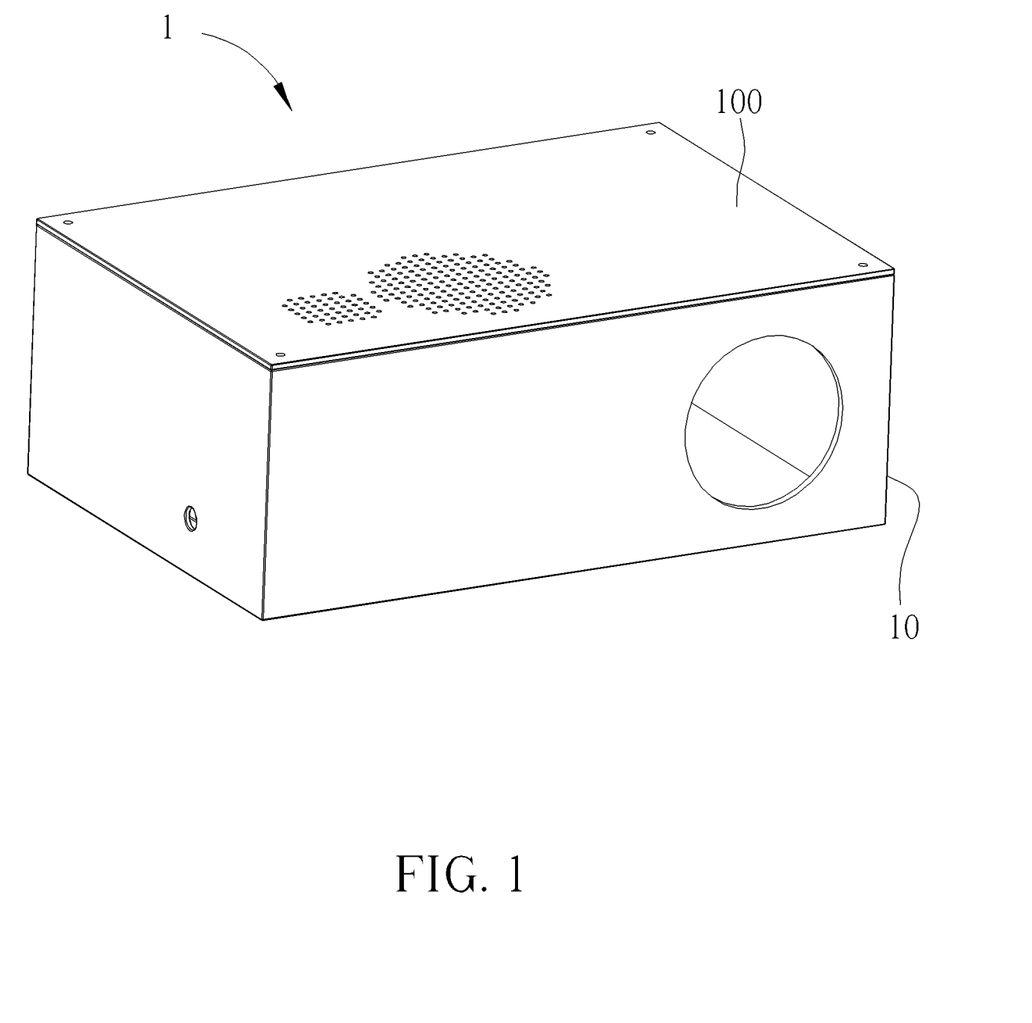
FIG. 1 is a perspective view illustrating a projector according to an embodiment of the invention.
Figure 2:
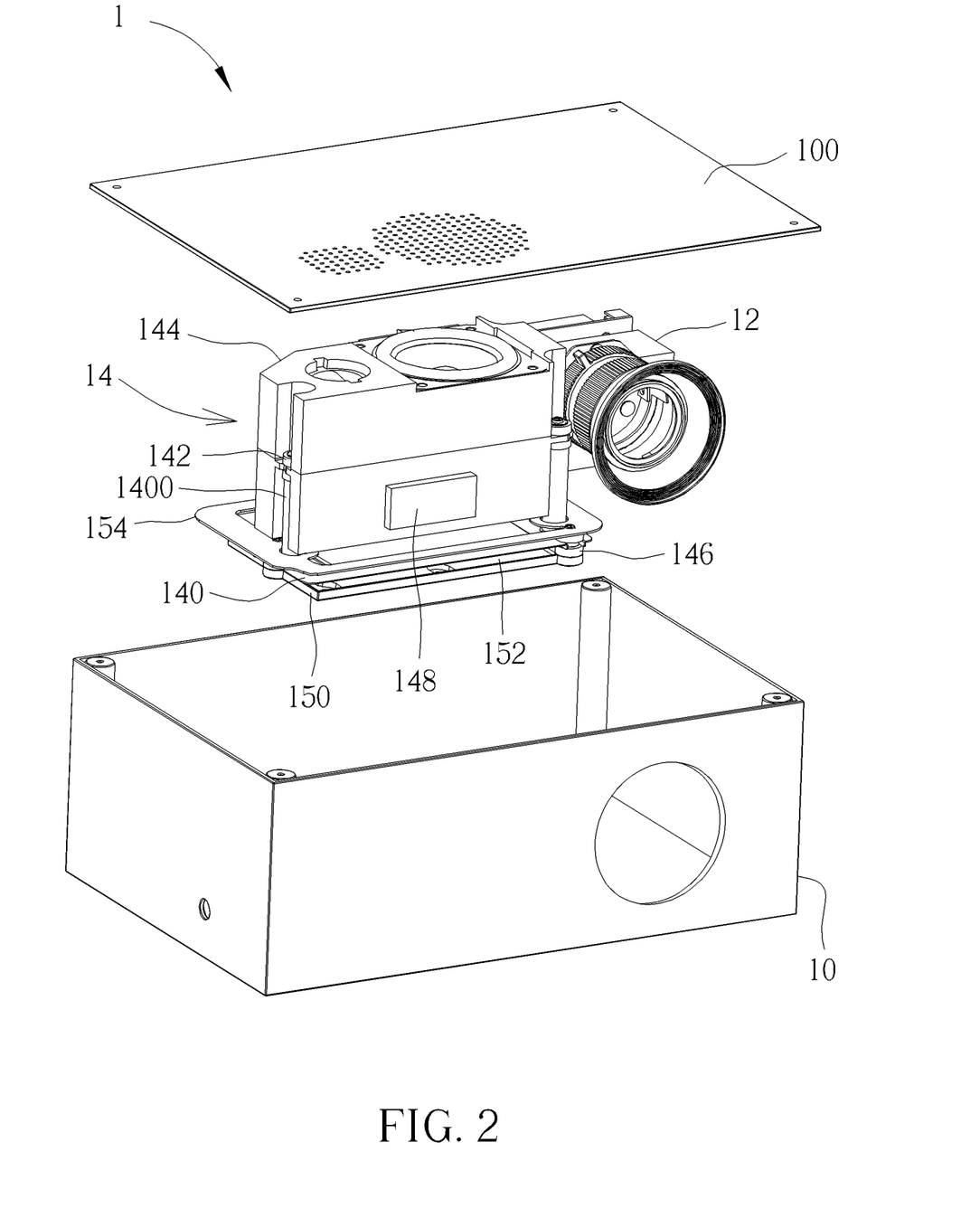
FIG. 2 is an exploded view illustrating the projector shown in FIG. 1.
Figure 3:
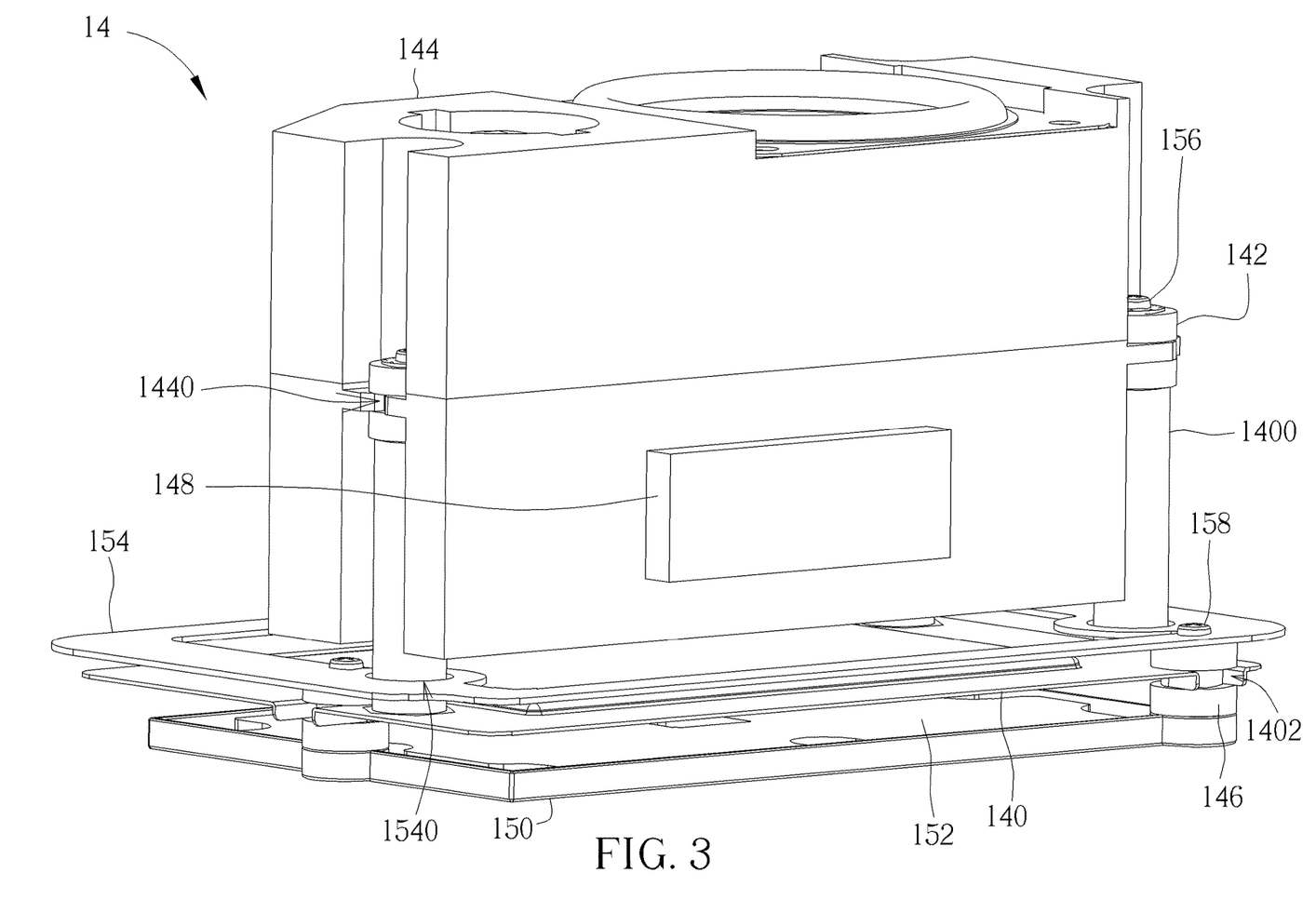
FIG. 3 is a perspective view illustrating the speaker module shown in FIG. 2.
Figure 4:
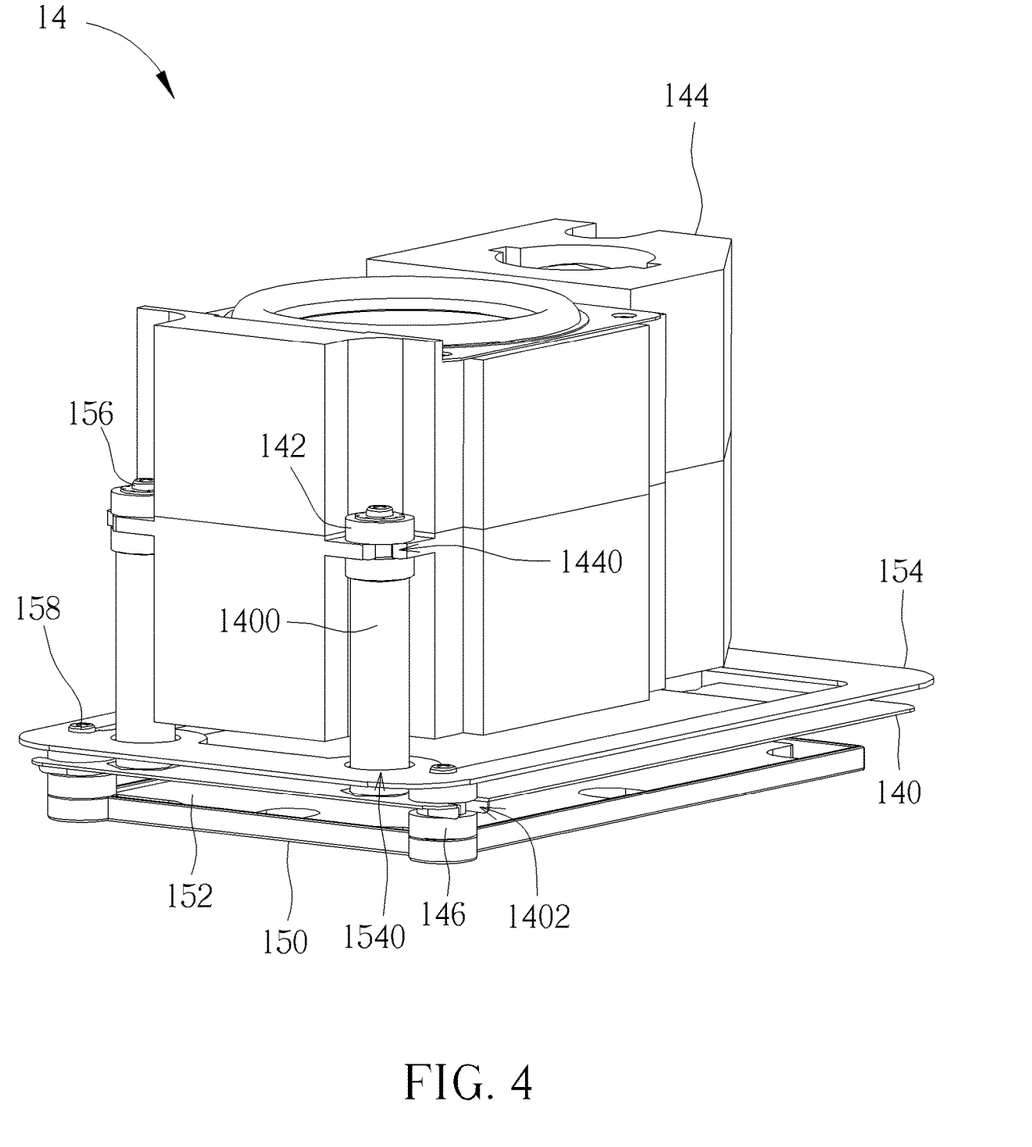
FIG. 4 is a perspective view illustrating the speaker module shown in FIG. 3 from another viewing angle.
Figure 5:
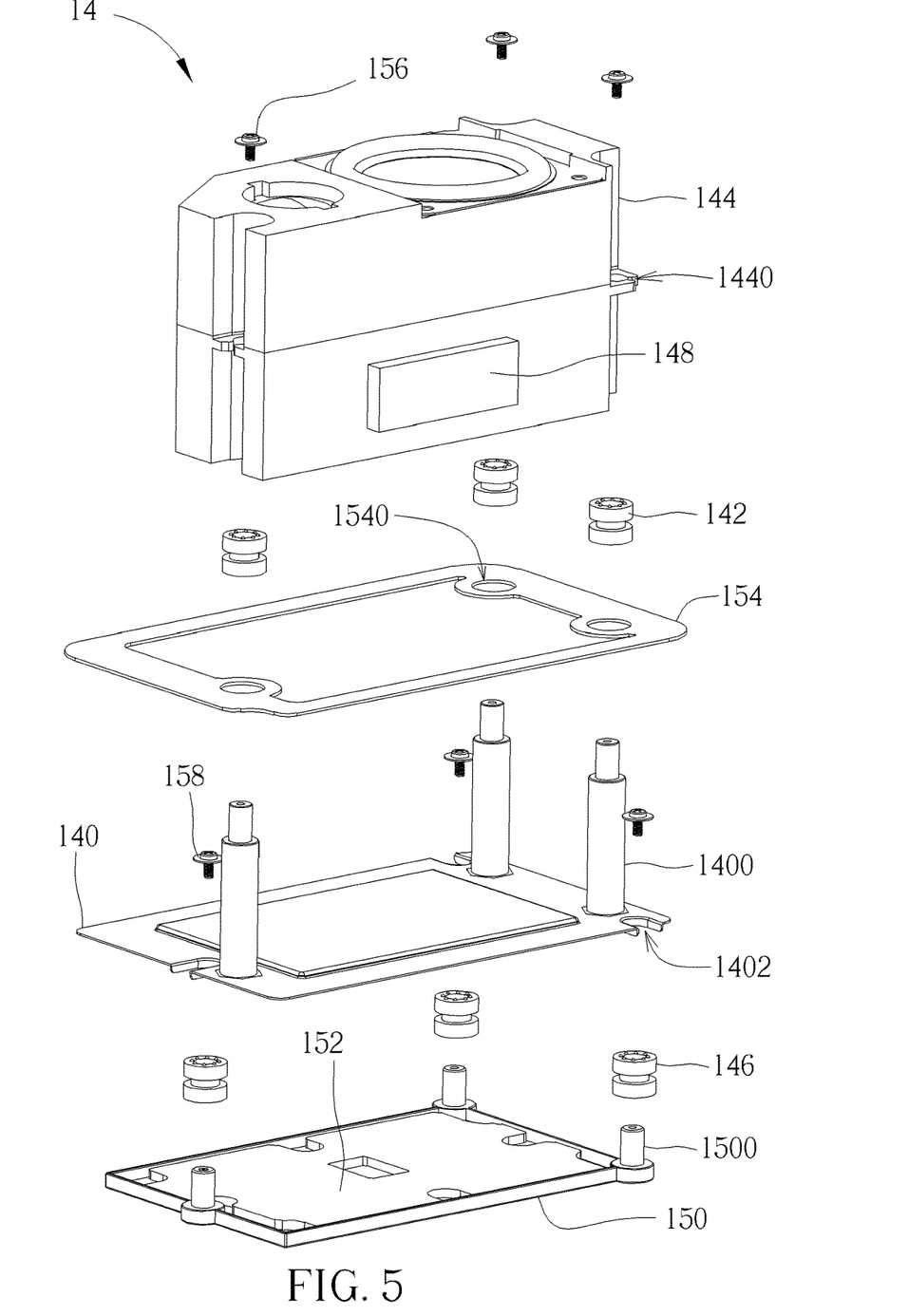
FIG. 5 is an exploded view illustrating the speaker module shown in FIG. 3.
Figure 6:
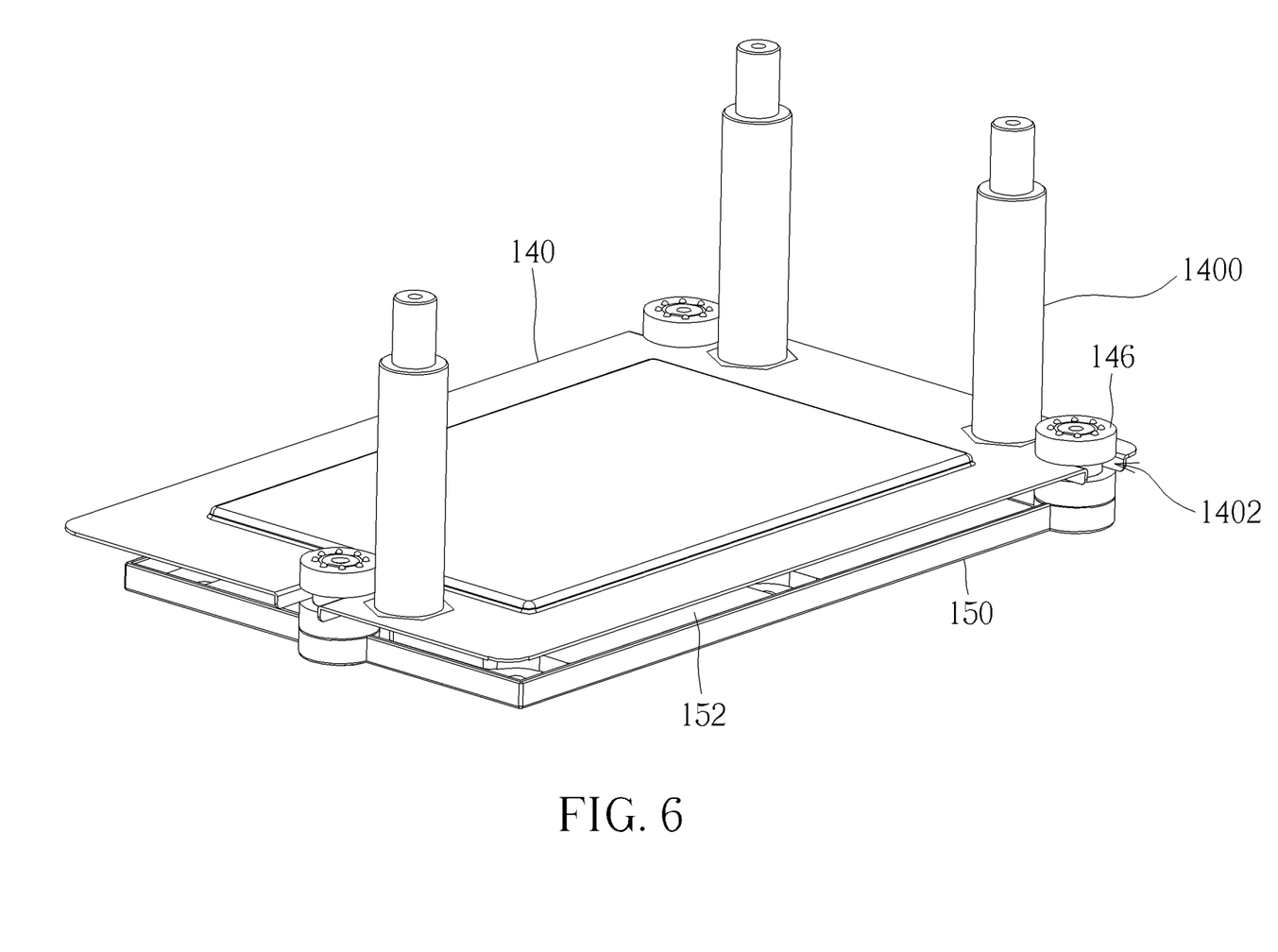
FIG. 6 is an assembly view illustrating the bracket, the second cushion members and the base shown in FIG. 5.

Referring to FIGS. 1 to 6, FIG. 1 is a perspective view illustrating a projector 1 according to an embodiment of the invention, FIG. 2 is an exploded view illustrating the projector 1 shown in FIG. 1, FIG. 3 is a perspective view illustrating the speaker module 14 shown in FIG. 2, FIG. 4 is a perspective view illustrating the speaker module 14 shown in FIG. 3 from another viewing angle, FIG. 5 is an exploded view illustrating the speaker module 14 shown in FIG. 3, and FIG. 6 is an assembly view illustrating the bracket 140, the second cushion members 146 and the base 150 shown in FIG. 5.

As shown in FIGS. 1 and 2, the projector 1 comprises a casing 10, a projection module 12 and a speaker module 14. The projection module 12 and the speaker module 14 are disposed in the casing 10. In this embodiment, the casing 10 may comprise a cover 100. In general, the projection module 12 may comprise various optical components including a lens, a light source, an optical module and so on, wherein the light source is configured to emit light beam and the light beam is processed by the optical module and then projected to form an image through the lens. In practical applications, the optical module may be a so-called optical engine. Since the imaging principle of the projector 1 is well known by one skilled in the art, it will not be depicted herein in detail.

As shown in FIGS. 3 to 6, the speaker module 14 comprises a bracket 140, a plurality of first cushion members 142, a speaker 144, a plurality of second cushion members 146, a first weighting member 148, a base 150, a second weighting member 152, a sheet metal member 154, a plurality of first fixing members 156 and a plurality of second fixing members 158.

The bracket 140 comprises a plurality of first pillars 1400. Each of the first cushion members 142 is disposed on one of the first pillars 1400. The speaker 144 is connected to the first cushion members 142. In this embodiment, a periphery of the speaker 144 may have a plurality of first engaging recesses 1440 formed thereon and the first cushion members 142 may be I-shaped. The first cushion members 142 are engaged with the first engaging recesses 1440 of the speaker 144, such that the speaker 144 is connected to the first cushion members 142 and supported over the bracket 140 by the first pillars 1400. The first fixing members 156 are used to fix the first cushion members 142 on the first pillars 1400. In practical applications, the first fixing members 156 may be, but not limited to, screws. In this embodiment, the first cushion member 142 may be an air cushion, a hydraulic cylinder, a spring, a rubber, or a sponge according to practical applications. It should be noted that the number of the first pillars 1400, the first cushion members 142, the first engaging recesses 1440 and the first fixing members 156 may be determined according to practical applications, so the invention is not limited to the embodiment shown in the figures.

The second cushion members 146 are connected to a periphery of the bracket 140. Furthermore, the base 150 comprises a plurality of second pillars 1500. Each of the second cushion members 146 is disposed on one of the second pillars 1500. In this embodiment, the periphery of the bracket 140 may have a plurality of second engaging recesses 1402 formed thereon and the second cushion members 146 may be I-shaped. The second cushion members 146 are engaged with the second engaging recesses 1402 of the bracket 140, such that the second cushion members 146 are connected to the periphery of the bracket 140 and the bracket 140 is supported over the base 150 by the second pillars 1500. The second fixing members 158 are used to fix the second cushion members 146 on the second pillars 1500. In practical applications, the second fixing members 158 may be, but not limited to, screws. In this embodiment, the second cushion member 146 may be an air cushion, a hydraulic cylinder, a spring, a rubber, or a sponge according to practical applications. It should be noted that the number of the second pillars 1500, the second cushion members 146, the second engaging recesses 1402 and the second fixing members 158 may be determined according to practical applications, so the invention is not limited to the embodiment shown in the figures. In another embodiment, the invention may dispose the second pillars 1500 on the bottom of the casing 10 and omit the base 150.

By means of double vibration-proof structure consisting of the first cushion members 142 and the second cushion members 146, the vibration generated by the speaker 144 can be absorbed effectively, so as to prevent the projection module 12 and the speaker 144 from resonating with each other. Accordingly, the speaker module 14 of the invention can provide good vibration-proof effect, so as to ensure the stability of projection screen.

Figure 7:
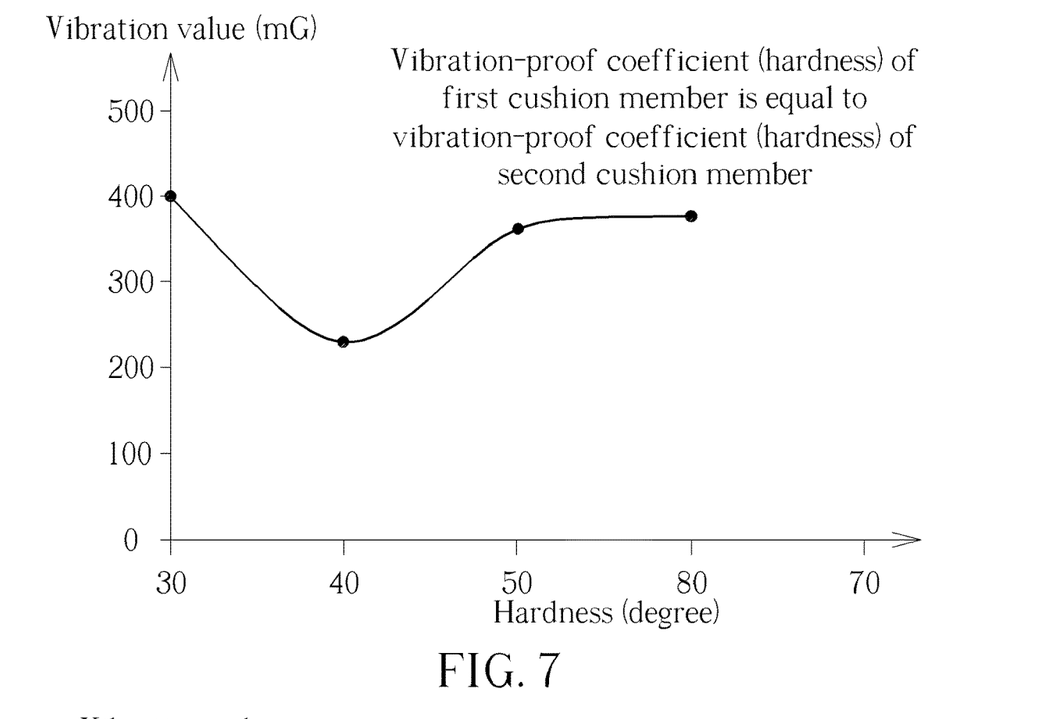
FIG. 7 illustrates experimental data obtained by assuming that a vibration-proof coefficient of the first cushion member is equal to a vibration-proof coefficient of the second cushion member.

Referring to FIG. 7, FIG. 7 illustrates experimental data obtained by assuming that a vibration-proof coefficient of the first cushion member 142 is equal to a vibration-proof coefficient of the second cushion member 146. In FIG. 7, the invention uses hardness to be vibration-proof coefficient to obtain the experimental data, wherein the vertical axis represents vibration value of the speaker module 14 and the horizontal axis represents hardness of the first cushion member 142 and the second cushion member 146. As shown in FIG. 7, when the hardness of the first cushion member 142 is equal to the hardness of the second cushion member 146, the vibration-proof effect may be better at 40 degrees of hardness.

Figure 8:
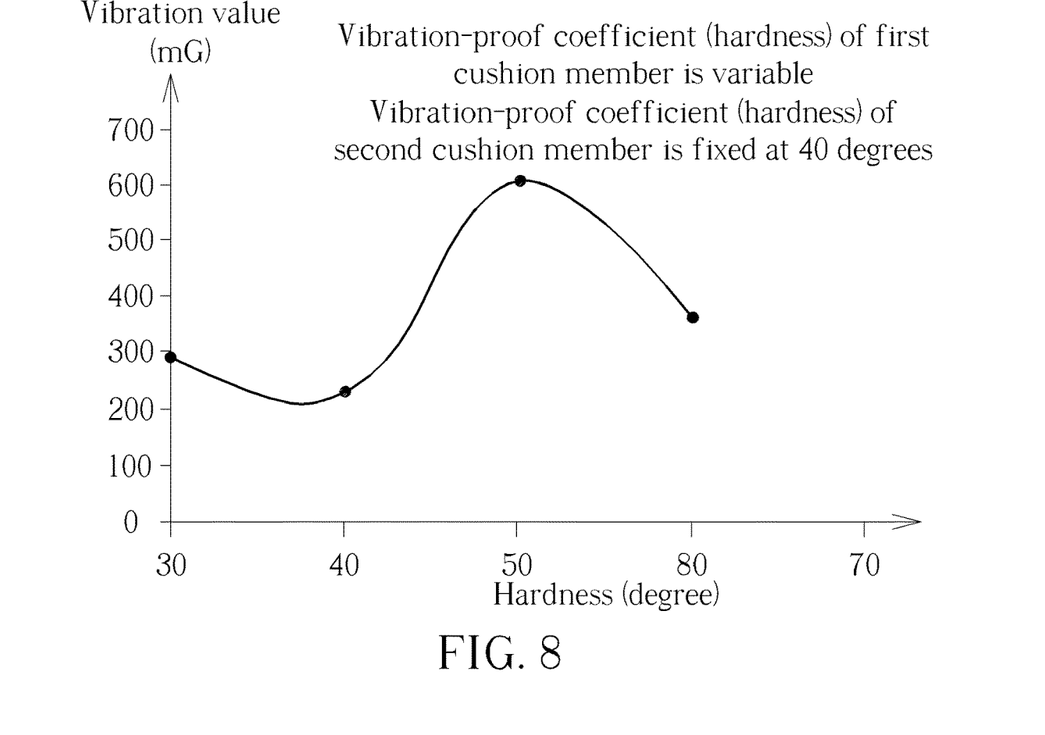
FIG. 8 illustrates experimental data obtained by assuming that a vibration-proof coefficient of the first cushion member is variable and a vibration-proof coefficient of the second cushion member is constant.

Referring to FIG. 8, FIG. 8 illustrates experimental data obtained by assuming that a vibration-proof coefficient of the first cushion member 142 is variable and a vibration-proof coefficient of the second cushion member 146 is constant. In FIG. 8, the invention still uses hardness to be vibration-proof coefficient to obtain the experimental data, wherein the vertical axis represents vibration value of the speaker module 14, the horizontal axis represents hardness of the first cushion member 142, and hardness of the second cushion member 146 is fixed at 40 degrees. As shown in FIG. 8, when the hardness of the first cushion member 142 is smaller than the hardness of the second cushion member 146, the vibration value may be relatively smaller, i.e. the vibration-proof effect may be relatively better. Accordingly, the invention may set the vibration-proof coefficient of the first cushion member 142 to be smaller than the vibration-proof coefficient of the second cushion member 146, so as to obtain better vibration-proof effect.

Figure 9:
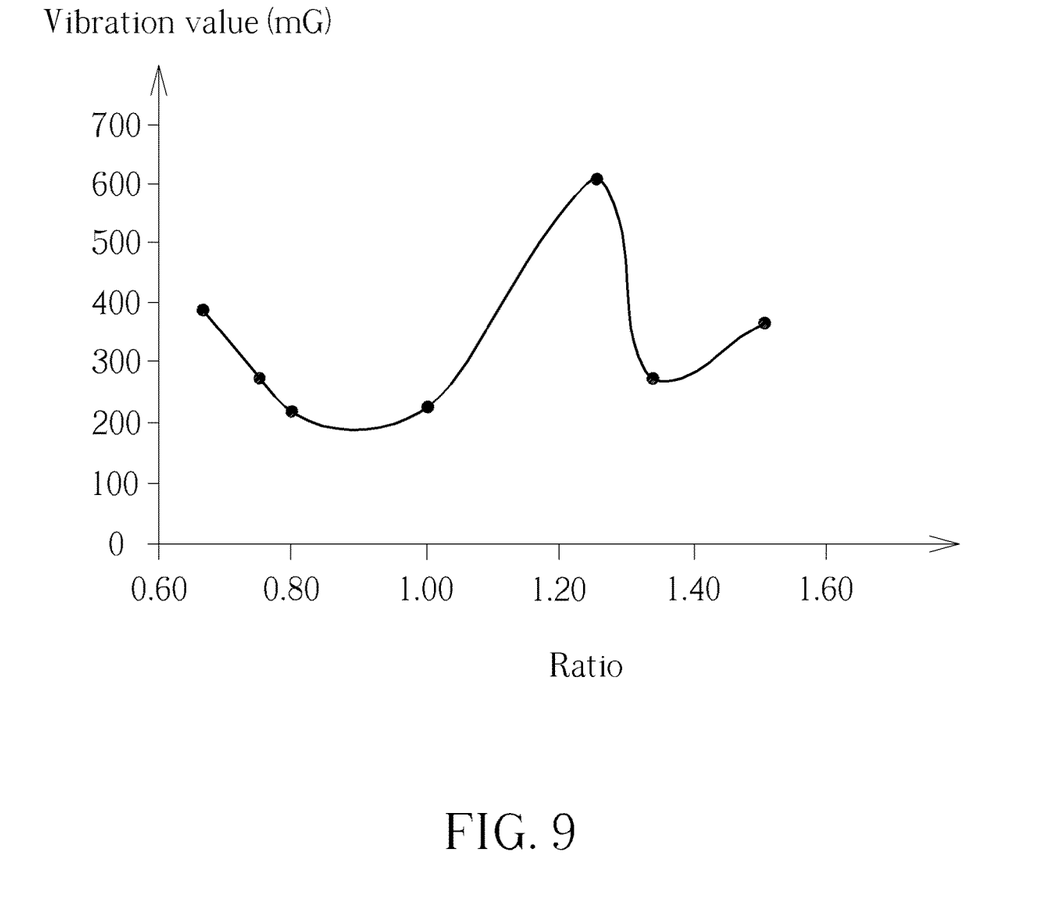
FIG. 9 illustrates experimental data obtained according to a ratio of the vibration-proof coefficient of the first cushion member to the vibration-proof coefficient of the second cushion member.

Referring to FIG. 9, FIG. 9 illustrates experimental data obtained according to a ratio of the vibration-proof coefficient of the first cushion member 142 to the vibration-proof coefficient of the second cushion member 146. In FIG. 9, the invention still uses hardness to be vibration-proof coefficient to obtain the experimental data, wherein the vertical axis represents vibration value of the speaker module 14 and the horizontal axis represents the ratio of the hardness of the first cushion member 142 to the hardness of the second cushion member 146. As shown in FIG. 9, when the ratio of the hardness of the first cushion member 142 to the hardness of the second cushion member 146 is larger than or equal to 0.8 and smaller than 1, the vibration value may be relatively smaller, i.e. the vibration-proof effect may be relatively better. Accordingly, the invention may set the ratio of the hardness of the first cushion member 142 to the hardness of the second cushion member 146 to be larger than or equal to 0.8 and smaller than 1, so as to obtain better vibration-proof effect.

It should be noted that in addition to hardness, the aforesaid vibration-proof coefficient may also be material, size, coefficient of elasticity, and so on according to practical applications.

Furthermore, the first weighting member is disposed on the speaker 144 and the second weighting member 152 is disposed on the base 150. The first weighting member 148 and the second weighting member 152 can increase total weight of the speaker module 14, so as to further reduce vibration generated by the speaker 144. In this embodiment, the first weighting member 148 and the second weighting member 152 may be iron blocks or other objects. In another embodiment, if the invention disposes the second pillars 1500 on the bottom of the casing 10 and omits the base 150, the second weighting member 152 may be disposed on the bottom of the casing 10.

Moreover, the sheet metal member 154 is connected to the first pillars 1400. In this embodiment, the sheet metal member 154 may have a plurality of holes 1540 formed thereon and the first pillars are inserted into the holes 1540. In this embodiment, the sheet metal member 154 may be fixed on the first pillars 1400 by adhesive, welding or other fixing manners. The sheet metal member 154 can increase structural rigidity of the first pillars 1400, so as to further reduce vibration generated by the speaker 144.

Figure 10:
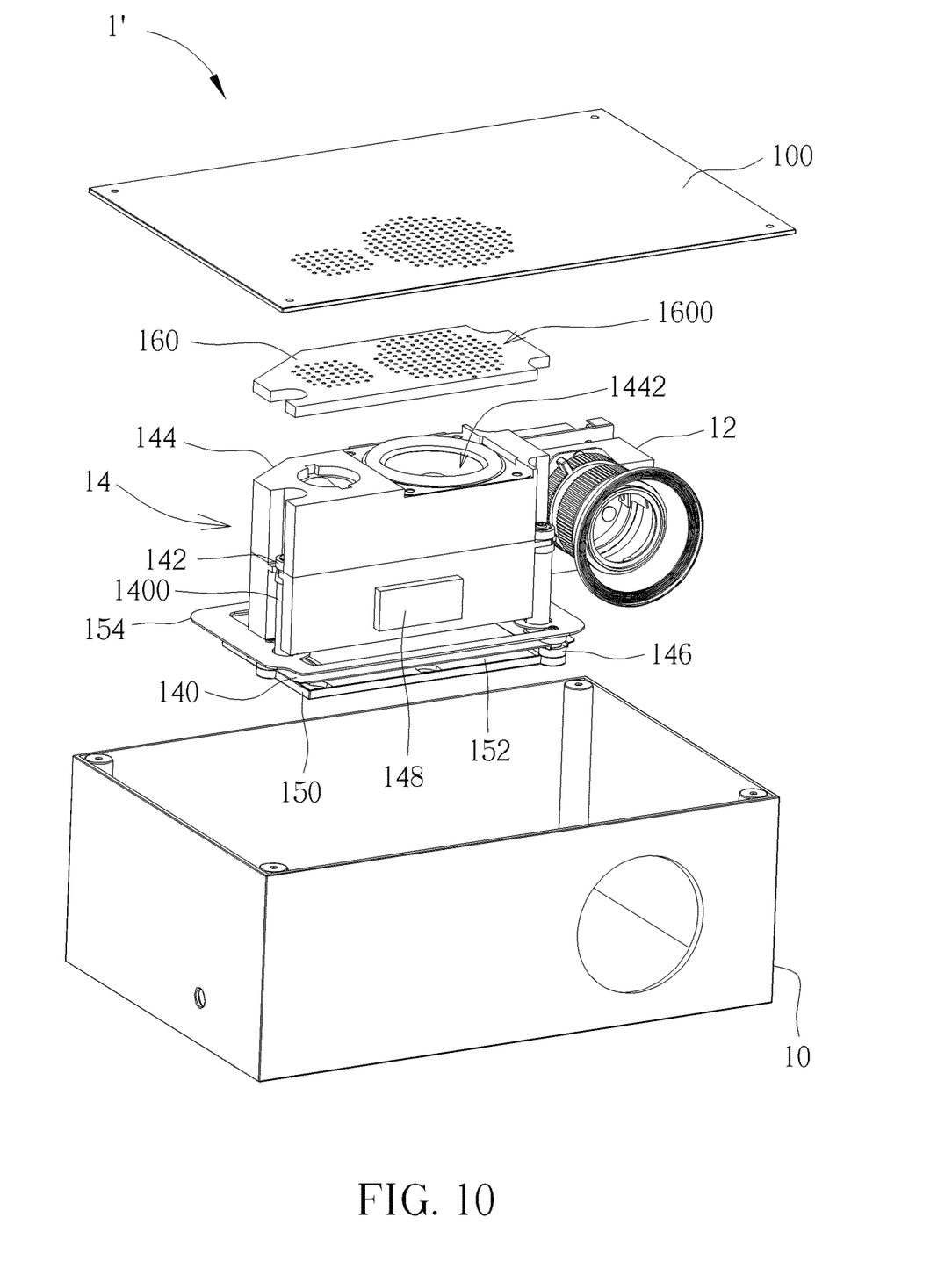
FIG. 10 is an exploded view illustrating a projector according to another embodiment of the invention.

Referring to FIG. 10, FIG. 10 is an exploded view illustrating a projector 1' according to another embodiment of the invention. The main difference between the projector 1' and the aforesaid projector 1 is that the speaker module 14 of the projector 1' further comprises a sponge 160, as shown in FIG. 10. After assembling the projector 1', the sponge 160 is disposed on the speaker 144 and abuts against the cover 100 of the casing 10. By means of friction between the sponge 160 and the cover 100, the invention can further reduce vibration generated by the speaker 144. In this embodiment, the sponge 160 has a plurality of through holes 1600 and positions of the through holes 1600 correspond to a position of a sound hole 1442 of the speaker 144. Accordingly, the sponge 160 will not hinder sound outputted by the speaker 144.

As mentioned in the above, the invention disposes the first cushion members on the first pillars of the bracket and connects the second cushion members to the periphery of the bracket. By means of double vibration-proof structure consisting of the first cushion members and the second cushion members, the vibration generated by the speaker can be absorbed effectively, so as to prevent the projection module and the speaker from resonating with each other. Accordingly, the speaker module of the invention can provide good vibration-proof effect, so as to ensure the stability of projection screen. Furthermore, the invention may selectively use the first weighting member, the second weighting member, the sheet metal member and/or the sponge to further improve vibration-proof effect. Moreover, the invention may selectively adjust the vibration-proof coefficients of the first cushion member and the second cushion member to further improve vibration-proof effect.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A speaker module comprising:
a bracket comprising a plurality of first pillars;
a plurality of first cushion members, each of the first cushion members being disposed on one of the first pillars;
a speaker connected to the first cushion members; and
a plurality of second cushion members connected to a periphery of the bracket;
wherein a vibration-proof coefficient of the first cushion member is smaller than a vibration-proof coefficient of the second cushion member.

2. The speaker module of claim 1, further comprising a first weighting member disposed on the speaker.

3. The speaker module of claim 1, further comprising a base, the base comprising a plurality of second pillars, each of the second cushion members being disposed on one of the second pillars.

4. The speaker module of claim 3, further comprising a second weighting member disposed on the base.

5. The speaker module of claim 1, further comprising a sheet metal member connected to the first pillars.

6. The speaker module of claim 1, further comprising a sponge disposed on the speaker.

7. The speaker module of claim 6, wherein the sponge has a plurality of through holes and positions of the through holes correspond to a position of a sound hole of the speaker.

8. The speaker module of claim 1, wherein a ratio of the vibration-proof coefficient of the first cushion member to the vibration-proof coefficient of the second cushion member is larger than or equal to 0.8 and smaller than 1.

9. A projector comprising:
a casing;
a projection module disposed in the casing; and
a speaker module disposed in the casing, the speaker module comprising:
a bracket comprising a plurality of first pillars;
a plurality of first cushion members, each of the first cushion members being disposed on one of the first pillars;
a speaker connected to the first cushion members;
a base comprising a plurality of second pillars; and
a plurality of second cushion members connected to a periphery of the bracket, each of the second cushion members being disposed on one of the second pillars.

10. The projector of claim 9, wherein the speaker module further comprises a first weighting member disposed on the speaker.

11. The projector of claim 9, wherein the speaker module further comprises a second weighting member disposed on the base.

12. The projector of claim 9, wherein the speaker module further comprises a sheet metal member connected to the first pillars.

13. The projector of claim 9, wherein the speaker module further comprises a sponge disposed on the speaker and abutting against the casing.

14. The projector of claim 13, wherein the sponge has a plurality of through holes and positions of the through holes correspond to a position of a sound hole of the speaker.

15. The projector of claim 9, wherein a vibration-proof coefficient of the first cushion member is smaller than a vibration-proof coefficient of the second cushion member.

16. The projector of claim 15, wherein a ratio of the vibration-proof coefficient of the first cushion member to the vibration-proof coefficient of the second cushion member is larger than or equal to 0.8 and smaller than 1.

* * * * *